United States Patent [19]

Patel et al.

[11] Patent Number: 5,605,555
[45] Date of Patent: Feb. 25, 1997

[54] AIR/OIL SEPARATOR WITH INTERLOCKED FLANGE

[75] Inventors: Jhina U. Patel, Willoughby, Ohio; Morgan H. Morgan, Greenville, Tenn.

[73] Assignee: Air-Maze Corporation, Stow, Ohio

[21] Appl. No.: 453,634

[22] Filed: May 30, 1995

[51] Int. Cl.$^6$ .................................................. B01D 35/30
[52] U.S. Cl. ........................... 55/502; 55/510; 55/DIG. 5
[58] Field of Search ....................... 55/502, 510, DIG. 5; 264/DIG. 48; 210/493.2, 493.5

[56] References Cited

U.S. PATENT DOCUMENTS

| | | | |
|---|---|---|---|
| 3,209,520 | 10/1965 | McKinlay | 55/510 X |
| 3,423,909 | 1/1969 | Bennett et al. | 55/502 X |
| 3,747,303 | 7/1973 | Jordan | 55/510 X |
| 4,392,958 | 7/1983 | Ganzi et al. | 264/DIG. 48 |
| 4,861,479 | 8/1989 | Solzer | 55/DIG. 5 |
| 5,275,636 | 1/1994 | Dudley et al. | 55/DIG. 5 |
| 5,350,515 | 9/1994 | Stark et al. | 210/493.2 |
| 5,484,466 | 1/1996 | Brown et al. | 55/502 X |

FOREIGN PATENT DOCUMENTS

| | | | |
|---|---|---|---|
| 247074 | 5/1966 | Germany | 55/510 |

*Primary Examiner*—Richard L. Chiesa
*Attorney, Agent, or Firm*—Rankin, Hill, Lewis & Clark

[57] ABSTRACT

An air/oil separator or other filtering assembly includes a filter media pack having first and second ends. A flange member is located at the first end of the media pack. The flange member includes a flange for mounting the filtering assembly. A retainer member is located at the second end of the media pack. A layer of perforated material is attached to the flange member. The perforated material is located adjacent to the first end of the media pack. Hardenable material permeates the first end of the media pack and permeates the perforated material to mechanically interlock the flange member to the media pack. A similar mechanical interlock is provided between the media pack and the retainer member. These mechanical interlocks eliminate the interior straps which had previously been used to secure the flange member to the retainer member.

11 Claims, 3 Drawing Sheets

AIR/OIL SEPARATOR WITH INTERLOCKED FLANGE

BACKGROUND OF THE INVENTION

1. Field of the Invention

This invention relates to air/oil separators or other fluid separating or filtering devices, and in particular to a separator or filter having a unique interlocking arrangement for holding the filter media to the end flange members.

2. Description of the Prior Art

Air/oil separators and other types of filtering devices have conventionally been formed of a cylindrical media pack having end caps or retainers on each end. In the design of certain air/oil separators and other filters, one of the end caps, typically, the top end cap that has the outlet opening, is provided with a flange extending radially outwardly around the top of the separator. This flange is used to mount the separator, for example, in an oil reservoir. Since the entire weight of the separator is supported by this flange, a plurality of straps was provided on the inside of the media pack to support the other end cap from the flange and to hold the separator together. The straps were welded at one end to the upper end cap or flange member and welded at the other end to the bottom end cap or retainer member. The media pack was thus held in position between the top and bottom end caps by the straps.

While this arrangement provided a suitable air/oil separator, the presence of the straps added to the manufacturing cost of the separator. In addition, the location of the straps inside the media pack could affect the flow of oil through the filtering media. While it would be desirable to eliminate the straps, the filter media pack must then be anchored securely in the top and bottom end caps in order to provide support for the separator, and these anchoring mechanisms must be less expensive to produce than the straps that they replace.

SUMMARY OF THE INVENTION

The present invention provides a unique design for an air/oil separator or other filtering device in which the separator is constructed without the need for interior support straps. By eliminating the need for the straps, the construction of the air/oil separator is simplified and the manufacturing cost of the separator is reduced. Furthermore, any possibility of having the straps interfere with the flow of fluid through the filtering media is eliminated.

In order to eliminate the straps, the air/oil separator of the present invention uses unique interlocking mechanisms between the filter media pack and the top and bottom end cap members. These unique interlocking mechanisms make use of the hardenable sealant that is commonly used between the filter media pack and the end cap members, and provide a mechanical arrangement in which the sealant engages portions of the end cap members to secure the filter media thereto.

Specifically, the top flange member is provided with a band of a perforated material adjacent to the media pack. The perforations in the band permit the hardenable sealant to permeate the band. The sealant also permeates the upper end of the media pack, and, since it hardens to form a solid material, it secures the flange member to the media pack. The bottom retainer member is also provided with suitable convolutions, preferably dimples in the other portion of the retainer member, which are surrounded by the hardenable sealant which permeates the lower end of the media pack to secure the bottom retainer member to the media pack.

The interlocking mechanisms of the present invention provide a means for securely holding the filter media pack to the flange and retainer members without the need for internal straps. Furthermore, the secure interlocking of the media pack to the flange and retainer members is accomplished without the need for additional members that would otherwise add to the cost and manufacturing complexity of the air/oil separator. The interlocking mechanism of this invention makes use of the hardenable sealant which is also used to seal the media pack to the end members. The sealant thus serves a double purpose of sealing the media pack to the end members and assisting in mechanically securing the media pack to the end members.

These and other advantages are provided by the present invention of a filtering or separating assembly which comprises a filter media pack having first and second ends. A flange member is located at the first end of the media pack. The flange member includes a flange for mounting the filtering assembly. A retainer member is located at the second end of the media pack. A layer of perforated material is attached to the flange member. The perforated material is located adjacent to the first end of the media pack. Hardenable material permeates the first end of the media pack and permeates the perforated material to mechanically interlock the flange member to the media pack.

DETAILED DESCRIPTION OF THE PREFERRED EMBODIMENT

Figure 1:
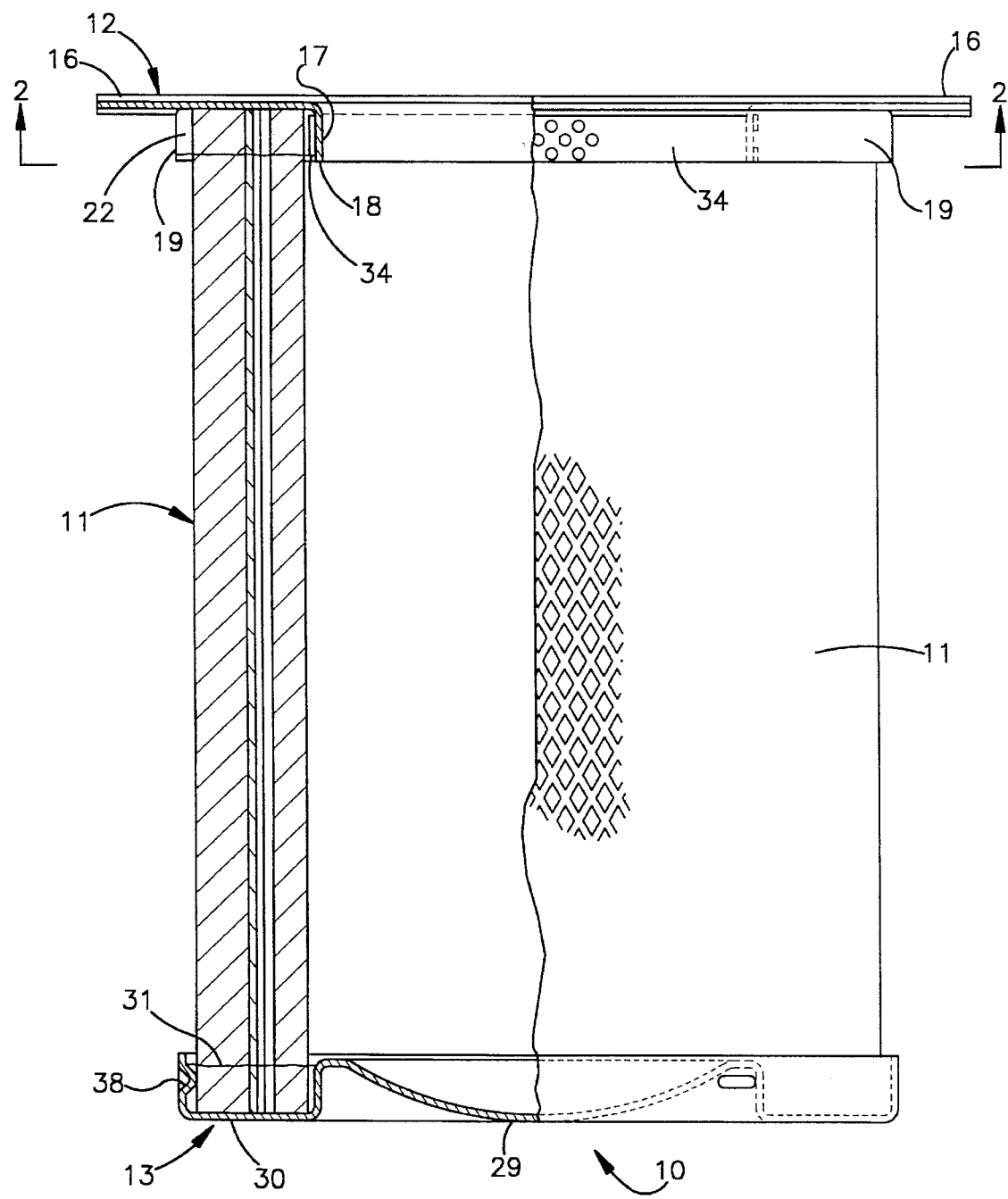
FIG. 1 is a side elevational view, partially in section, of an air/oil separator of the present invention.
Figure 3:
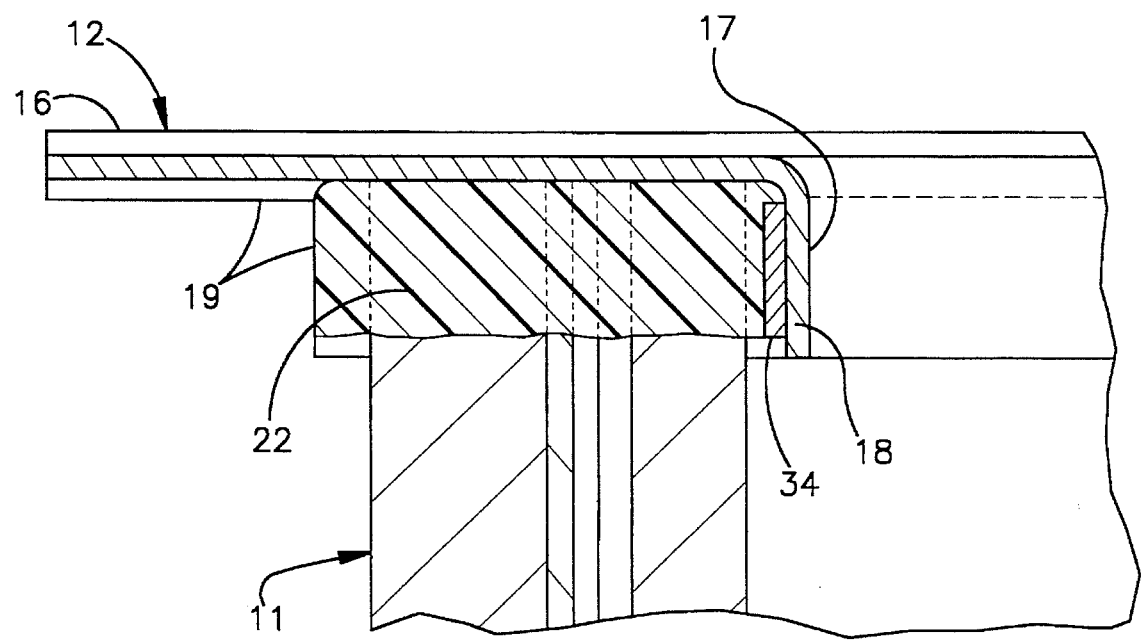
FIG. 3 is a side sectional view of a portion of air/oil separator of FIG. 1 to a larger scale showing the connection of the media pack to the flange member.

Referring more particularly to the drawings and initially to FIG. 1, there is shown an air oil separator 10 according to the present invention. While the invention will be shown and described with respect to the air/oil separator 10, it should be understood that the principles of the present invention may also be used in the assembly of other filtering and separating devices, such as air filters or air cleaners, and other fluid separators. The air/oil separator 10 comprises a cylindrical filter media pack 11, with a top end cap or flange member 12 on one end, and a bottom end cap or retainer member 13 on the other end. As shown in FIGS. 1 and 3, the flange member 12 includes a flange 16 which extends radially outwardly around the top of the air/oil separator 10 and which is used to mount the separator, for example, in an oil reservoir. The flange member 12 has an outlet opening 17 through which oil may be drawn from the separator. Around the outside of the opening 17, the flange member 12 is formed into a circumferential inner rim 18 which extends axially into the separator. An L-shaped ring 19 is securely attached to the flange 16 and extends parallel to the inner rim 18 to form a complementary outer rim. Preferably the flange member 12 is formed of galvanized steel or other suitable material.

The upper end of the media pack 11 is positioned within the U-shaped channel formed between the ring 19 and the rim 18. A hardenable sealant 22 is placed within this channel to seal the media pack 11 to the flange member 12 and prevent fluid from entering the interior of the separator within flowing through the media pack. The sealant is preferably a urethane sealant. The media pack 11 may be comprised of any suitable combination of filtering elements, such as fiberglass, polyester or polypropylene.

Figure 4:
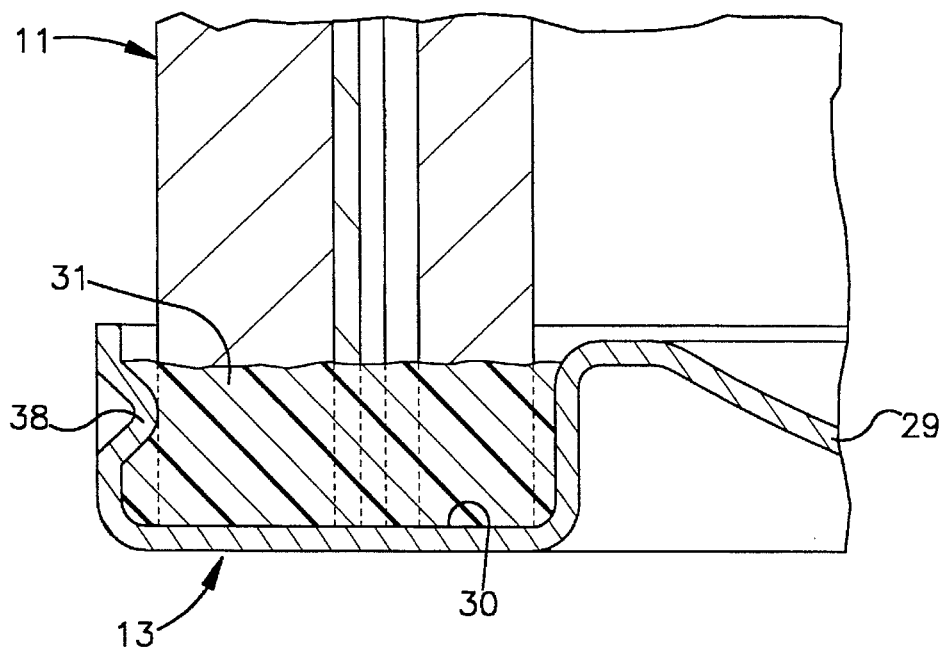
FIG. 4 is a side sectional view of a portion of air/oil separator of FIG. 1 to a larger scale showing the connection of the media pack to the retainer member.

As shown in FIGS. 1 and 4, the retainer member 13 encloses the end of the media pack 11 opposite the flange member 12. The retainer member 13 is formed of a single circular piece of metal with the inner portion 29 formed in a spherical depression and the circumferential outer portion formed into a U-shaped channel 30 to accept the lower end of the medial pack 11. Preferably, the retainer member 13 is formed of galvanized steel or other suitable material. A hardenable sealant 31 is placed in the channel 30 to seal the lower end of the media pack to the retainer member 13 and prevent oil from entering the interior of the separator without passing through the filter media. The sealant 31, like the sealant 22, is preferably a urethane sealant.

In use, the air/oil separator 10 is suspended, for example, in an oil reservoir, using the flange 16. Since the entire separator is supported by the flange 16, it has been necessary in the past to provide some means to support the entire separator from the flange. The prior art air/oil separators have included a plurality of metal straps located on the inside of the media pack. These straps were welded at one end to the flange member and welded at the other end to the retainer member. The retainer member was thus supported from the flange member by means of these straps with the media pack held therebetween, and in this manner, the entire separator was supported.

Figure 2:
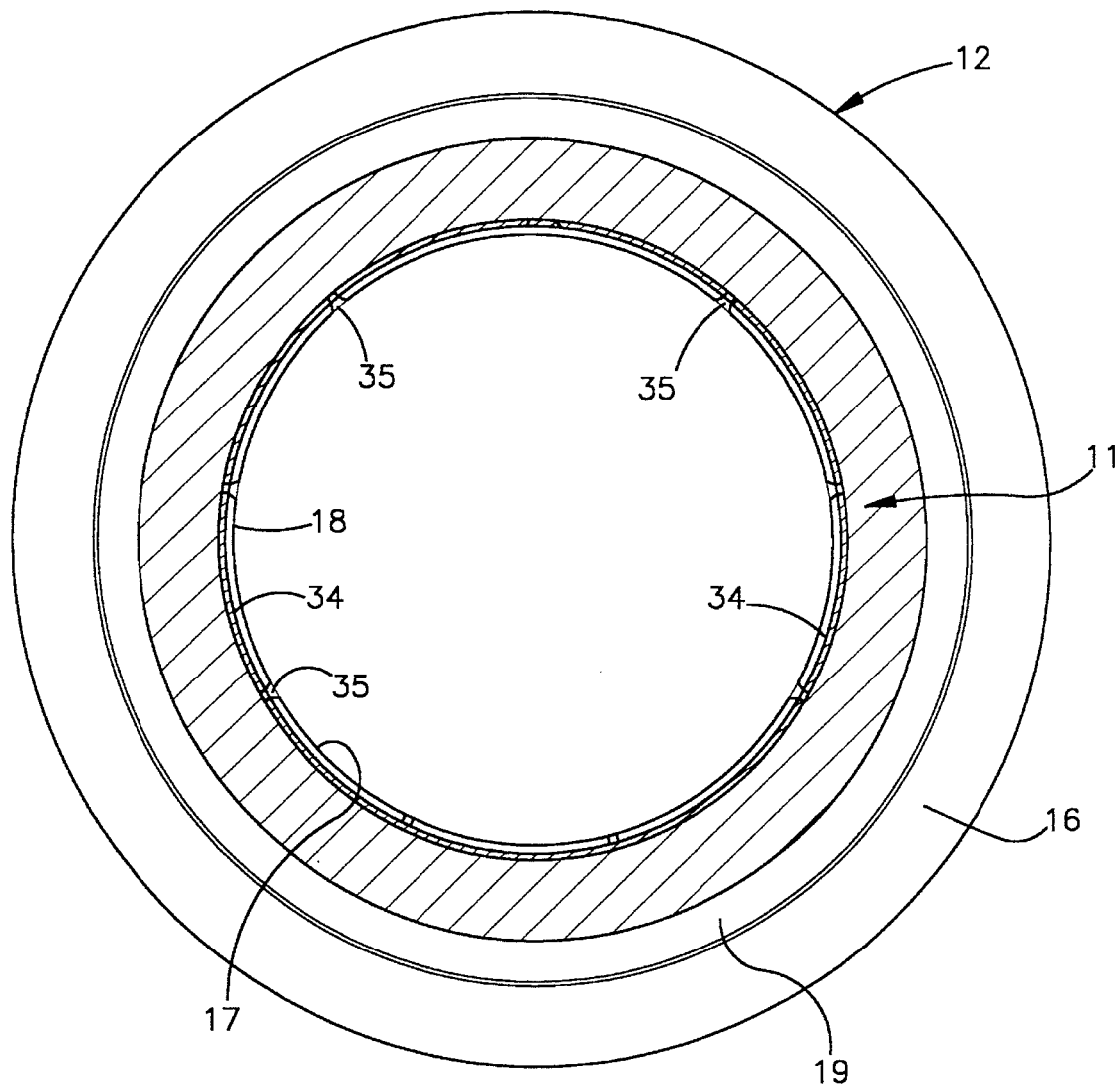
FIG. 2 is a top sectional view taken along line 2—2 of FIG. 1.

In accordance with this invention, the straps of the prior art air/oil separators are eliminated, and the separator is supported by means of unique interlocking arrangements on each end of the media pack. Specifically, a layer or band 34 formed of a perforated material is spot welded to the inside of the rim 18 of the flange member 12. The band 34 can be formed of any suitable material, but is preferably formed of 16 or 14 gauge galvanized perforated steel with staggered holes, each 1/8 inch in diameter, formed in an 1/8 by 3/16 inch array. Such material can be obtained commercially from various sources. The band 34 is preferably spot welded around the rim 18 with weld spots 35 about every 2 inches to suitably attach the band to the flange member 12 (FIG. 2). Spot welding is preferred since it provides some spacing between the band 34 and the rim 18 and allows the sealant 22 to permeate this space between the band and the rim. The sealant 22 can thus permeate the band 34 completely along most of the length of the band since the band is unattached to the flange member except at the weld spots 35. The sealant 22 should be such that it becomes very hard after application so that it forms a secure bond between the media pack 11 and the band 34. Preferably, the sealant 22 should have a Shore D hardness of at least 80 after curing. The sealant 22 should also have sufficient structural properties after curing, such as shear strength and tensile strength to prevent breaking of the sealant after assembly. The use of the sealant 22 thus permits a secure mechanical interlock to be formed between the media pack 11 and the flange member 12.

To secure the retainer member 13 to the media pack 11, a plurality of dimples 38 are formed on the outer portion of the U-shaped channel 30 of the retainer member. Any number of dimples may be formed, but preferably there are three dimples 38 provided symmetrically around the retainer member. The hardenable sealant 31 which permeates the lower end of the media pack 11 also fills the area around each of the dimples 38 to hold the retainer member 13 to the media pack. The sealant 31, like the sealant 22, hardens after application and has suitable structural properties to form a secure bond between the media pack 11 and the retainer member 13.

The perforated band 34 spot welded to the flange member 12 and the dimples 38 formed on the retainer member 13 in combination with the strong, hardenable sealants 22 and 31 thus provide mechanical interlocking arrangements by which the media pack 11 is secured to the top flange member 12 and the bottom retainer member 13, eliminating the need for the interior straps used in the prior art.

While it is preferred to attach the perforated band 34 to the inside of the rim 18 so that the band extends in an axial direction and engages the inside of the media pack 11, the band can be placed at other locations on the flange member 12. For example, the perforated band could be formed as an annular ring and welded to the radially extending portion of the flange member so that it engages the top end of the media pack, or the band could be welded to the inside of the L-shaped ring 19 so as to engage the outside of the media pack.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A filtering assembly, which comprises:

a filter media pack having first and second ends;

a flange member at the first end of the media pack, the flange member including a flange for mounting the filtering assembly;

a retainer member at the second end of the media pack;

a layer of perforated material attached to the flange member, the perforated material located adjacent to the first end of the media pack and spaced from the second end of the media pack; and hardenable material which permeates the first end of the media pack and which permeates the perforated material to mechanically interlock the flange member to the media pack.

2. A filtering assembly as defined in claim 1, wherein the retainer member includes convolutions, and comprising in addition, second hardenable material which permeates the second end of the media pack and which fills around the convolutions to mechanically interlock the retaining member to the media pack.

3. A filter assembly as defined in claim 1, wherein one of the flange member and the retainer member has an outlet opening through which fluid flows.

4. A filter assembly as defined in claim 1, wherein the hardenable material is a sealant which seals the first end of the media pack to the flange member to prevent fluid from flowing around the media pack.

5. A filter assembly as defined in claim 1, wherein the media pack is substantially cylindrically shaped.

6. A filter assembly as defined in claim 1, wherein the layer of perforated material is attached to the flange member at a plurality of locations spaced apart from each other to allow the perforated material to remain unattached to the flange member at other locations and to allow the hardenable material to permeate the perforated material at said other locations.

7. A filter assembly as defined in claim 1, wherein the layer of perforated material is a thin, circular band of perforated metal extending around the flange member adjacent to the media pack.

8. A filtering assembly for filtering a fluid, which comprises:

- a substantially cylindrical filter media pack having first and second ends, the media pack having an interior;
- a flange member at the first end of the media pack, the flange member having an outlet opening for flow of fluid from the interior of the media pack, the flange member including a flange for mounting the filtering assembly;
- a retainer member at the second end of the media pack, the retainer member enclosing one end of the interior of the media pack, the retainer member including convolutions;
- a layer of perforated material attached to the flange member, the perforated material located adjacent to the first end of the media pack and spaced from the second end of the media pack;
- a first hardenable material which permeates the first end of the media pack and which permeates the perforated material to mechanically interlock the flange member to the media pack; and
- a second hardenable material which permeates the second end of the media pack and which surrounds the convolutions to mechanically interlock the retainer member to the media pack.

9. A filter assembly as defined in claim 8, wherein the first hardenable material is a sealant which seals the first end of the media pack to the flange member to prevent fluid from flowing around the media pack, and the second hardenable material is a sealant which seals the second end of the media pack to the retainer member to prevent fluid from flowing around the media pack.

10. A filter assembly as defined in claim 8, wherein the layer of perforated material is attached to the flange member at a plurality of locations spaced apart from each other to allow the perforated material to remain unattached to the flange member at other locations and to allow the hardenable material to permeate the perforated material at said other locations.

11. A filter assembly as defined in claim 8, wherein the layer of perforated material is a thin, circular band of perforated metal extending around the flange member adjacent to the media pack.

* * * * *

UNITED STATES PATENT AND TRADEMARK OFFICE
CERTIFICATE OF CORRECTION

PATENT NO : 5,605,555
DATED : February 25, 1997
INVENTOR(S) : Jhina U. Patel et al.

It is certified that error appears in the above-identified patent and that said Letters Patent are hereby corrected as shown below:

Column 2, line 47, "air oil" should be —air/oil—.
Column 3, line 16, "medial" should be —media—.

Signed and Sealed this

Twenty-ninth Day of April, 1997

Attest:

BRUCE LEHMAN

Attesting Officer

Commissioner of Patents and Trademarks